United States Patent
Smarto et al.

[11] Patent Number: 5,953,150
[45] Date of Patent: Sep. 14, 1999

[54] EDGE DESIGN FOR ELECTROCHROMIC DEVICES

[75] Inventors: John E. Smarto, Trafford; Charles R. Coleman, Pittsburgh, both of Pa.

[73] Assignee: PPG Industries Ohio, Inc., Cleveland, Ohio

[21] Appl. No.: 08/996,064

[22] Filed: Dec. 22, 1997

[51] Int. Cl.[6] ............................. G02F 1/1339; G02F 1/15
[52] U.S. Cl. ........................ 359/265; 349/153; 359/274
[58] Field of Search ................................. 359/265–275; 349/153

[56] References Cited

U.S. PATENT DOCUMENTS

| | | | |
|---|---|---|---|
| 4,174,152 | 11/1979 | Giglia et al. | 350/357 |
| 4,335,938 | 6/1982 | Giglia et al. | 350/357 |
| 4,361,385 | 11/1982 | Huang et al. | 350/357 |
| 4,478,991 | 10/1984 | Huang et al. | 526/287 |
| 4,554,318 | 11/1985 | Rukavina | 525/118 |
| 4,609,703 | 9/1986 | Rukavina | 524/360 |
| 4,670,350 | 6/1987 | Rukavina | 428/520 |
| 5,288,381 | 2/1994 | Cogan et al. | 204/192.26 |
| 5,327,281 | 7/1994 | Cogan et al. | 359/270 |
| 5,433,810 | 7/1995 | Abrams | 156/273.7 |
| 5,471,338 | 11/1995 | Yu et al. | 359/273 |
| 5,618,390 | 4/1997 | Yu et al. | 204/192.26 |
| 5,687,465 | 11/1997 | Hinata et al. | 29/402.01 |
| 5,706,069 | 1/1998 | Hermens et al. | 349/153 |

OTHER PUBLICATIONS

Copending U.S. Patent Application Serial No. 08/970,031 entitled, "Suspension Lamination Method and Device", filed Nov. 13, 1997, by C. R. Coleman et al.

*Primary Examiner*—Georgia Epps
*Assistant Examiner*—Margaret Burke
*Attorney, Agent, or Firm*—William C. Mitchell

[57] ABSTRACT

A novel edge design for a laminated electrochromic device containing an ion-conducting material layer prone to moisture gain or loss disposed between first and second substrates is disclosed. The device is characterized by a continuous nub on its circumferential edge which is aligned with the ion-conducting material interface between the substrates forming the device. The nub can be used to interlock with a peripheral edge seal.

31 Claims, 2 Drawing Sheets

EDGE DESIGN FOR ELECTROCHROMIC DEVICES

FIELD OF THE INVENTION

The instant invention is directed to a novel edge design for a laminated electrochromic or electrooptic device.

BACKGROUND OF THE ART

The optical properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device utilizes reversible oxidation and reduction reactions to achieve optical switching.

Conventional electrochromic devices comprise at least one thin film of a persistent electrochromic material, i.e. a material which, in response to application of an electric field of given polarity, changes from a high-transmittance, non-absorbing state to a low-transmittance, absorbing or reflecting state. Since the degree of optical modulation is directly proportional to the current flow induced by the applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer. The electrochromic film(s) and ion-conductive material are disposed between two electrodes, forming a laminated cell.

When the electrode adjacent to the electrochromic film is the cathode, application of an electric field causes darkening of the film. Reversing the polarity causes electrochromic switching, and the film reverts to its high-transmittance state. Typically, an electrochromic film such as tungsten oxide is deposited on a substrate coated with an electroconductive film such as tin oxide or indium tin oxide to form one electrode. The counter electrode is typically a similar tin oxide or indium tin oxide coated substrate.

As voltage is applied across the electrodes, ions are conducted through the ion-conducting material. To ensure reliable operation, the ion-conducting material layer generally must be sealed so as to maintain its water content within a range sufficient to provide required ion conductivity. Absent an adequate seal, moisture loss or gain through the exposed edge of the ion-conducting material layer will impact performance.

The instant invention addresses this need by providing a nubbed-edge design that facilitates application of an edge seal to the peripheral edge of an electrochromic device.

U.S. Pat. No. 4,174,152 to Giglia, et al., discloses electrochromic devices wherein the polymeric electrolyte material is a hydrophilic copolymer of a selected acrylate or methacrylate monomer and a selected acid group containing a monomer, such as 2-acrylamido-2-methylpropanesulfonic acid.

U.S. Pat. No. 4,335,938 to Giglia discloses electrochromic devices having a layer of tungsten oxide in contact with a layer of organic electrolyte resin comprising a hydrophilic layer of 2-acrylamido-2-methylpropanesulfonic acid homopolymer and an electrode means for changing electrochromic properties of the device.

U.S. Pat. No. 5,433,810 to Abrams discloses a method and device for bonding composite eyeglass lenses. This reference is silent regarding sealing the edges of composite lenses.

U.S. Pat. Nos. 4,361,385 and 4,478,991 to Huang, et al., disclose electrochromic devices having a layer of electrochromic tungsten oxide in contact with a polymeric electrolyte wherein the stability and speed of the device are improved by using a copolymer of 2-acrylamido-2-methylpropanesulfonic acid and vinyl sulfonic acid as the polymer electrolyte. The polymer mixture is cast, dried and hydrated in contact with the electrochromic film, and then a second electrode consisting of paper-carbon is pressed against the polymer layer with a second tin oxide-coated glass plate backing the carbon-paper electrode.

U.S. Pat. Nos. 4,554,318; 4,609,703 and 4,670,350 to Rukavina disclose copolymers of acrylic acid and cyanoethylacrylate, including terpolymers with hydroxyethylacrylate, useful as primers for bonding metal-containing coatings to organic polymer substrates.

U.S. Pat. No. 5,471,338 to Yu, et al., discloses lamination of two coated plastic substrates using a layer of polymer which bonds with both coated surfaces to form a composite. Homo and copolymers of 2-acrylamido-2-methyl propyl sulfonic acid (AMPSA) form the ion-conducting polymer layer and are cured using actinic radiation, preferably (UV) light. AMPSA/N,N-dimethylacrylamide (DMA) polymers are preferred, and benzoin methyl ether and diethoxyacetophenone are disclosed as UV initiators.

U.S. Pat. No. 5,288,381 to Cogan, et al., discloses a method for preparing electrooptical devices which relies upon $Li^+$ ion conducting polymers such as polyethylene oxide.

U.S. Pat. No. 5,327,281 to Cogan discloses the use of epoxy to seal a cavity formed when a spacer is used to separate electrodes and contain a liquid electrolyte injected between the spaced electrodes. This patent does not disclose or suggest the novel edge design of the instant application.

SUMMARY OF THE INVENTION

This invention is directed to a novel edge design for laminated electrochromic or electrooptic devices, and is particularly useful when a peripheral edge seal is used to limit moisture gain or loss through the circumferential edge region of such a device.

In cases where the circumferential edge region or surface 14 of an electrochromic device 8 includes the outer surface of an ion-conducting material layer prone to moisture gain or loss, edge sealing is necessary. If, for example, ion-conducting polymer layer 7 is disposed between coated substrates 1 and 2 to form laminated electrochromic device 8, the circumferential edge region 14 of device 8 will include outer surface 9 of ion-conducting polymer layer 7. Edge seal 10 is necessary to restrict moisture gain or loss to/from polymer layer 7.

In accordance with the instant invention, the circumferential edge surface 14 of laminated electrochromic device 8 is characterized by peripheral nub 11 which is aligned or contiguous with the portion 9 of circumferential edge region 14 prone to moisture ingress or egress, i.e., the surface 9 of the ion-conducting polymer layer 7 exposed on circumferential edge surface 14 of device 8. Nub 11 facilitates attachment of moisture seal 10 to device 8 by interlocking with nub 11, thereby helping to maintain the water content of ion-conducting polymer layer 7 within a desired range and improving the structural integrity of device 8. This in turn helps to maintain suitable ion-mobility within ion-conducting polymer layer 7.

DETAILED DESCRIPTION OF THE INVENTION

Figure 1:
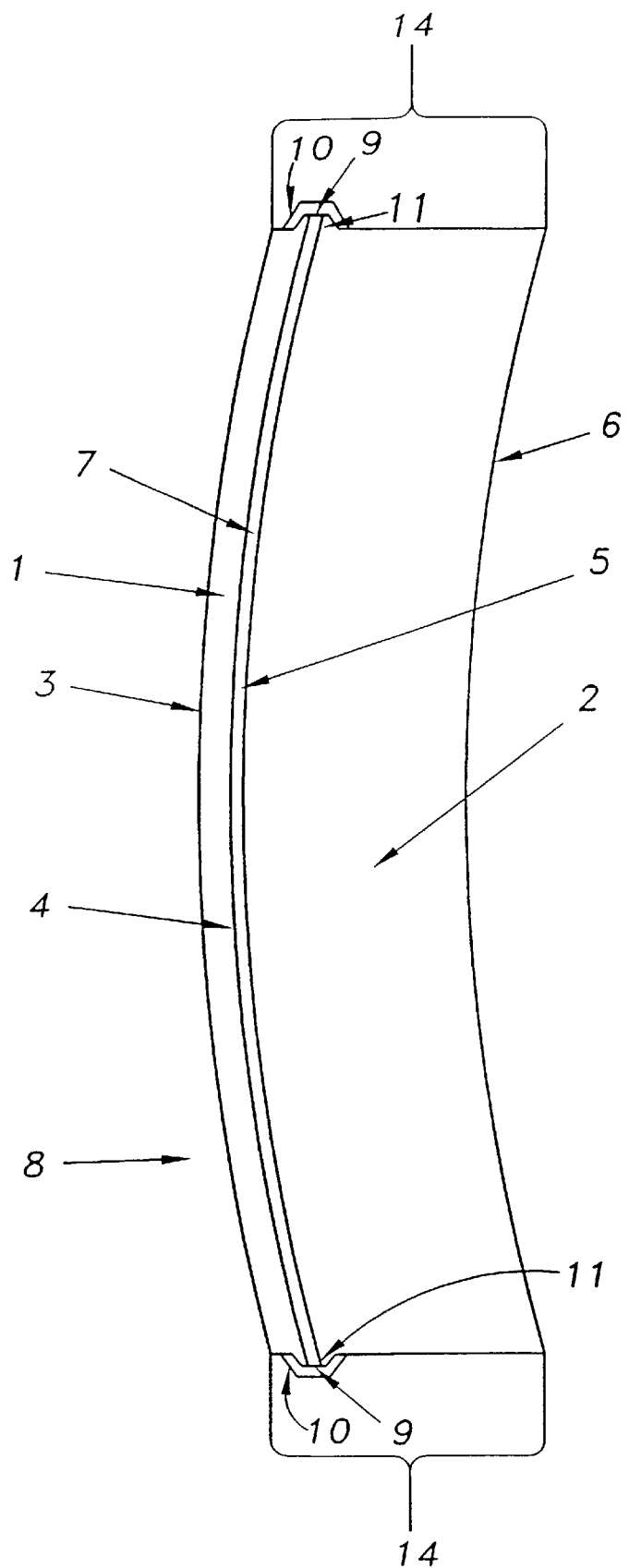
FIG. 1 is a cross-sectional side view of a laminated lens showing the peripheral nub of the present invention, in conjunction with an edge seal.

The surface of a laminated electrochromic device generally comprises first and second expanse regions which are contoured to provide desired optical properties and a peripheral or circumferential edge region between said first and second expanse regions. The circumferential edge region includes the outer surfaces of the individual layers comprising the laminated device. In the case of a laminated lens, the first and second expanse regions are the optical surfaces of the lens, which may be flat; simple or compound or complex curves (aspheric, bifocal, etc.).

The instant invention is directed to a laminated electrooptic or electrochromic device having a circumferential edge region comprising the outer surface of a layer prone to moisture gain or loss which is situated between the outer surfaces of first and second substrate layers, at least one of which is a coated substrate layer, wherein said circumferential edge region is characterized by one or more protrusions which is (are) contiguous or aligned with the outer surface of the layer prone to moisture gain or loss.

The instant invention is also applicable to electrooptic devices. As Used herein, electrooptic devices include those devices containing an electrooptic medium or component which is sensitive to moisture gain or loss. Examples include liquid crystal and suspended particle devices.

The instant invention is further directed to a laminated electrochromic device having a circumferential edge region comprising the outer surface of a first coated substrate layer, the outer surface of a second substrate layer which may or may not be coated, and the outer surface of an ion-conducting material layer prone to moisture gain or loss which is disposed between said first and second substrate layer outer surfaces, wherein said circumferential edge region is characterized by a nub situated on said edge region contiguous and/or aligned with a portion of said ion-conducting material layer outer surface. The nub may be continuous or intermittent, so long as it provides suitable fixturing, foundation and/or positioning properties. Continuous nubs are preferred. It is also preferred that the nub comprise a portion of each of said first and second substrates. In such devices, it is preferred that the ion-conducting material layer also serve as a laminating adhesive which bonds the mating surfaces of the first and second substrates. If it does not, a separate laminating adhesive can be used.

In the electrochromic devices of the instant invention, the ion-conducting material layer is disposed between the electrodes of the device as well as between the first and second substrates. Thus, as hereinafter described, the instant devices comprise a first electroconductive material layer which serves as a first electrode, an electrochromic layer, an ion-conducting material layer and a second electroconductive layer which serves as a second electrode. Preferably, a complimentary electrochromic layer is also used. These electroconductive and electrochromic layers, along with the ion-conducting material layer, can be arranged as a single stack deposited on a first substrate which is then laminated to a second substrate, or they can be arranged such that the electrodes are coated on separate substrates, followed by placement of one or more electrochromic layers and an ion-conducting material layer, and then lamination.

The instant invention is further directed to a method for preparing a nubbed laminated electrochromic device, said device having a circumferential edge region between first and second expanse regions, wherein a layer or portion of said edge region is prone to moisture ingress or egress, which method comprises: 1) forming one or more nubs on the outer circumferential edge of a first substrate adjacent to or contiguous with its mating surface; 2) optionally, but preferably, forming one or more nubs on the outer edge of a second substrate adjacent to its mating surface; 3) disposing a layer of material prone to moisture ingress or egress between the mating surfaces of said first and second substrates; and 4) laminating said first and second substrates by bonding their mating surfaces. This method forms a laminated device characterized by one or more circumferential nubs which is (are) contiguous with the portion of the device's edge region prone to moisture ingress or egress. A single, continuous nub is preferred. In the case of a laminated electrochromic lens, the nub(s) is (are) contiguous with the exposed surface of an ion-conducting polymer layer situated between the substrates comprising the laminated lens.

According to a preferred embodiment of the instant invention, a laminated electrochromic device comprising an ion-conducting material layer disposed between first and second electrodes which is generally but not necessarily shaped like a disk or lens and which has a peripheral edge region wherein the outer surface of said ion-conducting material layer is exposed, contains a continuous nub on its peripheral edge region contiguous with the outer surface of said ion-conducting material layer. While the nub preferably comprises a raised portion of each of the substrates used to form the device, a nub formed on the peripheral edge of either of the substrates adjacent to its mating surface is generally sufficient. The individual substrate nub(s) is(are) preferably formed prior to lamination by edging one or both of the substrates used to form the a device half cell. However, for some devices, a suitable peripheral nub can also be formed after lamination via conventional edge shaping techniques.

In the nubbed electrochromic devices of the instant invention, the nub can serve as a foundation for a bus bar. As used herein, the term 'bus bar' refers to a strip or band of a low resistance electrically conductive material that is in electrical contact with an electroconductive layer of an electrochromic device, generally around the periphery of the electroconductive layer. Bus bars can be applied to the instant nubs via conventional deposition techniques.

The nub can also serve as a mechanism which helps to secure an edge seal to a laminated device. Thus, a further aspect of the instant invention relates to an edge-sealed, laminated electrochromic device wherein the edge seal is interlocked with a continuous nub on the circumferential edge surface of the device. Further, the nub can serve as a reference point in various manufacturing processes which require attachment of an electrochromic device to processing equipment, e.g., a lens block. The nub is also useful for fixturing or positioning purposes.

As used herein, the term "nub" refers to any circumferential protruberance, bump, etc., formed by shaping, molding, cutting or edging one or both of the substrates comprising a laminated device. Since the nub is generally located at the interface of the substrates, complimentary half nubs can be edged onto each of the substrates; a full nub is then formed when the substrates are laminated. Suitable nubs can also be formed by edging either one of the substrates, as will be apparent to persons skilled in the lens edging art.

The height of the nub is not believed to be critical. The nub should be of sufficient height to provide an adequate bus bar foundation, edge seal interlock and/or positioning or fixturing area. Generally, for lenses, nub heights can range from about 0.001 to about 0.25 inch (0.0254 to about 6.25 mm), preferably from about 0.01 to about 0.15 inch (0.254 to about 2.5 mm). Heights may be much greater for larger electrochromic devices.

The cross-sectional profile of the instant nub is not believed to be critical; the nub can be, for example, cone-shaped, mesa shaped, square shaped, rounded or irregularly shaped. Cone-shapes having flat tops (also called mesas) are preferred. Also, it is desirable to avoid sharp nub corners or edges, as they tend to concentrate mechanical stress. For this reason rounded nubs or rounded mesas are preferred.

The laminated electrochromic devices of this invention contain an ion-conducting material layer disposed between mated first and second substrates. Various ion-conducting materials can be used, including for example, materials comprising hydrogen uranyl phosphate or polyethylene oxide/$LiClO_4$. Also, ion-conducting polymer electrolytes or inorganic films such as $LiNbO_3$, $LiBo_3$, $LiTaO_3$, $LiF$, $Ta_2O_5$, $Na_2AlF_6$, $Sb_2O_5 \cdot nH_2O + Sb_2O_3$, $Na_2O \cdot 11Al_2O_3$, $MgF_2$, $ZrO_2$, $Nb_2O_5$ and $Al_2O_3$ can be used as the ion-conducting material. Preferred ion-conducting materials are ion-conducting polymers; these polymers generally serve the dual functions of being ion-conducting electrolytes and mechanical adhesives. One class of suitable ion-conducting materials includes ion-containing polymers known as ionomers. These macromolecules contain ionizable groups covalently linked to a polymer chain, typically a hydrocarbon. Polystyrene sulfonic acid and poly (2-acrylamido-2-methyl-1-propanesulfonic acid) are examples of ionomers, both incorporating the protonic acid $SO_3H$ group on the polymer chain. Ionomers are generally formed by polymerizing monomers bearing both an ionizable group and an ethylenic, e.g. vinylic, group.

In accordance with a preferred embodiment of the present invention, the ion-conducting polymer electrolyte is a proton-conducting polymer selected from the group consisting of homopolymers of 2-acrylamido-2-methylpropanesulfonic acid (AMPSA) and copolymers of AMPSA with various monomers. Such polymers may be utilized in the form of preformed sheets which are laminated between the substrates, or in the form of liquid reaction mixtures of monomers which are cast and cured in place between the substrates. A preferred proton-conducting polymer electrolyte in accordance with the present invention is a copolymer of AMPSA and N,N-dimethylacrylamide (DMA), preferably cast and cured in place. More preferred copolymers of AMPSA and DMA are prepared from AMPSA and DMA monomers in a molar ratio range of about 1:3 to 1:2. The thickness of the polymer electrolyte is not believed to be critical but in general is in the range of 0.001 to 0.025 inch (0.0254 to 0.625 millimeter).

Cast-in-place methods of lamination are known in the art. A preferred method of lamination is the suspension lamination technique disclosed in copending U.S. patent application Ser. No. 08/970,031 to Coleman, Backfisch and Smarto, entitled "Suspension Lamination Method and Device," filed on Nov. 13, 1997. In this method, ion-conducting polymers are formed in situ between half cells of electrochromic devices by depositing a polymerizable monomer solution comprising one or more monomers and an initiator and, optionally, one or more non-reactive diluents or additives, onto one of the half cells, distributing the monomer solution between the half cells, and exposing the initiator in the monomer solution to an energy source during suspension, thereby initiating suspension polymerization of the monomer solution. The monomer solution generally comprises a sufficient amount of a photoinitiator to polymerize the monomers upon exposure to actinic radiation.

The first and second substrates of the instant nub-edged, laminated devices are generally glass or organic polymeric substrates conventionally used to prepare electrochromic articles or devices. Preferably, polymeric organic substrates are used. Nubbed substrates of the present invention are preferably prepared from transparent materials suitable for producing eyewear lenses, such as lenses prepared from synthetic organic optical resins. Alternatively, the substrate can be a non-transparent solid material.

Suitable transparent lenses may have a conventional refractive index (1.48–1.5), a relatively high refractive index (1.60–1.75), or a mid-range refractive index (1.51–1.59), depending on the end use. In general terms, a transparent lens may have a refractive index within the range of between 1.48 and 1.75, e.g., from about 1.50 to about 1.8.

Synthetic polymer substrates that may be used as a lens material include, but are not limited to: thermoplastic polycarbonates, such as the carbonate-linked resin derived from bisphenol A and phosgene, which is sold under the trademark LEXAN; polyesters, such as the material sold under the trademark, MYLAR; poly(methylmethacrylates), such as the material sold under the trademark, PLEXIGLAS; and polymerizates of a polyol(allyl carbonate) monomer, especially diethylene glycol bis(allyl carbonate), which is sold under the trademark CR-39® monomer. Copolymers of the aforedescribed monomers/resins may also be used as a lens material. These and other transparent and non-transparent polymeric substrates known in the art for use for various optical and non-optical applications may be used.

The nubbed electrochromic substrates of this invention generally contain electroconductive films and at least one electrochromic film, i.e. a film of a persistent electrochromic material which in response to the application of an electric field of a given polarity and sufficient voltage changes from a high-transmittance, non-absorbing state to a lower-transmittance, absorbing or reflecting state. When an electric field of opposite polarity is applied to the electrochromic material, it switches back to a high-transmittance state. The electrochromic film, which is both an ionic and electronic conductor, is in ion-conductive contact, preferably direct physical contact, with the ion-conductive material, preferably an ion-conductive polymer.

The electrochromic film and ion-conductive polymer are disposed between two electrodes (i.e., electroconductive films) to form a cell. In some applications, a complementary electrochromic film is also present in the cell, while in other applications an optically passive film or metal is used in place of the complementary electrochromic film to form the cell.

Conventionally, in the preparation of electrochromic lenses, a cathodically coloring electrochromic material, usually tungsten oxide or compounds thereof, is deposited at a thickness of about 800 to 5,000 Angstroms on a transparent substrate that has been previously coated with an electroconductive metal oxide film, such as tin oxide or indium tin oxide (ITO), which electroconductive film serves as one electrode. Preferably, the electroconductive film comprises indium and tin at a weight ratio of about 90:10. The film thickness is preferably in the range of about 800 to 4,000 Angstroms for acceptable conductivity. The electroconductive and electrochromic films may be deposited by a variety of methods so long as the substrate is not deleteriously affected. The adhesion of an electroconductive metal oxide film directly to a plastic substrate may be improved by application of a primer to said substrate prior to coating.

In such lenses, the counter electrode is prepared by depositing a similar metal oxide coating on a second transparent substrate, with or without a complimentary electrochromic film. A suitable complimentary electrochromic film is a nitrogen-containing iridium oxide film as disclosed in U.S. Pat. No. 5,618,390 to Yu, Backfisch, et al., which is incorporated herein by reference. The ion-conducting material is then disposed between substrates so coated; in the case of ion-conductive polymers, a precursor composition comprising one or more polymerizable monomers and a suitable initiator is generally cured or polymerized in situ by energy which passes through a transparent substrate coated with an electroconductive film and/or an electrochromic film.

Thus, composite electrochromic eyeglass lenses are generally formed by bonding first and second lenses together, wherein each lens comprises an edged, coated, transparent substrate. Bonding is preferably accomplished by placing an effective amount of a curable ion-conducting polymer (ICP) composition, i.e. a monomer solution comprising one or more monomers an effective amount of an initiator and optionally up to one or more non-reactive diluents and/or additives, on the concave mating surface of a matched lens pair and moving this concave surface and the convex surface of the corresponding lens toward each other, thereby spreading the curable adhesive composition between the lenses. The curable ICP composition is then cured via exposure to a suitable energy source. Curing of the polymer places an ion-conducting polymer between the lenses while bonding the lenses into a laminate, thereby facilitating necessary ion flow.

After lamination, the laminated electrochromic device, preferably an electrochromic eyewear lens, comprises an ion-conducting material, preferably an ion-conductive polymer, sandwiched between two substrates containing appropriate electroconductive and electrochromic films. Absent an edge seal, the ion-conducting material is exposed to the environment on the edge region of the laminated device. To reduce moisture transfer into or out of this layer, it is desirable to seal the edge of the lens prior to installation into a holding device such as an eyewear frame.

Any sealant which impedes moisture transport, which has suitable adherence characteristics and which is capable of being applied to the edge region of a lamination device can be used to seal the peripheral edge of an electrochromic device. Curing of the seal may or may not be necessary, depending on the material used as the seal. Suitable sealants for sealing the edges of electrochromic devices are epoxy resins, particularly those that adhere strongly to glass and/or organic substrates. As used herein, "epoxy resins" refer to those resins characterized by the presence of an epoxy or oxirane ring. Such resins may contain aliphatic, cycloaliphatic or aromatic backbones. Though cure times and temperatures are not critical to the instant invention, preferred epoxies have cure times of about 0.5 min. to about 24 hours, and are cured at temperatures between about 40° F. and 300° F. (4.4° C. and 149° C.). The epoxies provide an impediment to moisture ingress and egress and impact structural integrity to laminated devices.

Typically, epoxies are formed by combining a resin component with a hardener. Generally, the hardener and resin are preferably mixed immediately prior to application. A suitable epoxy for use as a sealant on the instant nub-edged electrochromic devices is Araldite® 2012, which is commercially available from Ciba Geigy.

Nubs can be formed by conventional lens edging techniques. Thus, each of the lenses forming a matched pair can be edged to include a raised portion or nub on its edge surface adjacent to its mating surface, thereby forming a half nub. Matched substrates can be edged separately or their nubs can be cut simultaneously while they are held together via a suitable coupling means.

After lamination, the half nubs form a full nub at the device interface. Alternatively, in some instances, the nub can be formed by edging a laminated device. In the case of electrochromic lenses, the profile of the edge nub should align with and compliment the profile of the edge seal.

The best mode known to the inventors is now described by reference to the Figures, which are enlarged to show detail and are not drawn to scale.

In FIG. 1, which shows a side view cross-section of an edge sealed laminated lens 8 containing an ion-conductive polymer layer 7, coated substrate 1 is the front lens of laminated lens 8. This front lens 1 has a front expanse or optical surface 3 and a rear mating surface 4 which is preferably coated. Coatings on mating surface 4 are not shown; these are conventional electroconductive and electrochromic coatings used in the preparation of electrochromic lenses as described above and are not critical to the instant invention. Laminated to substrate 1 is substrate 2, which is the rear lens. Rear lens 2 has a front mating surface 5 which is preferably coated and a rear expanse or optical surface 6. Coatings on surface 5 are not shown; these are conventional electroconductive and electrochromic coatings used in the preparation of electrochromic lenses and are not critical to the instant invention. An ion-conducting polymer layer 7 is disposed between substrates 1 and 2; this layer serves as both an ion-conducting electrolyte and a mechanical adhesive which bonds the mating surfaces 4 and 5 of substrates 1 and 2, respectively. On circumferential edge region 14 of laminated lens 8, the outer surface 9 ion-conducting polymer layer 7 is exposed, absent edge seal 10.

Thus, in the manufacture of electrochromic device 8, two opposing coated substrates 1 and 2 are laminated using an ion-conducting polymer 7. Following lamination, it is desirable to maintain the water content of ICP 7 near its original water content to maintain required ionic conductivity. This is accomplished by sealing the exposed outer surface 9 of polymer layer 7 on edge region 14 of device 8. The initial water content of the ion-conducting material generally depends on the ion-conducting material used in the manufacture of the device being sealed and is not critical to the instant invention.

Edge seal 10 can be formed by applying a suitable sealant via a conventional application means so as to seal outer surface 9 of polymer layer 7. Edge seal 10 is contiguous with outer surface 9 and is preferably shaped to form an apex over nub 11, thereby interlocking nub 11 and edge seal 10.

Nub 11 is formed on edge region 14 of device 8 by any means suitable for edging lenses to shape. Thus, conventional edging techniques known in the lens shaping art can be used; the edging technique employed is not part of the instant invention. Preferably, continuous nub 11 is made by forming a first half nub on the circumferential edge of substrate 1 adjacent to its mating surface 4 and a second half nub on the circumferential edge of substrate 2 adjacent to mating surface 5 prior to lamination. Polymer layer 7 is then placed between mating surfaces 4 and 5 to bond them; the half nubs then form nub 11 at the ion-conducting polymer interface of the device. Portions of continuous nub 11 can be removed by conventional techniques to form separate or intermittent nubs as desired.

Figure 2:
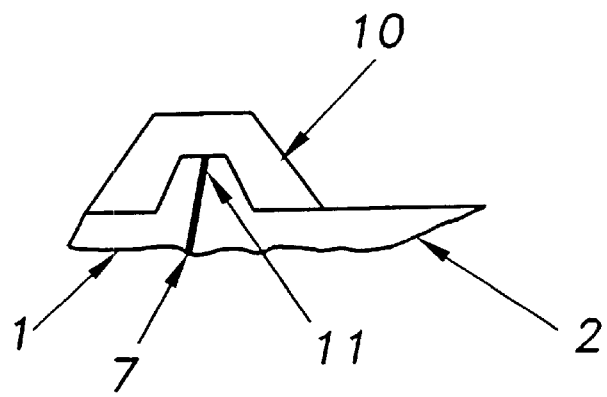
FIG. 2 is an expanded cross-sectional view of a mesa-shaped nub interlocked with an edge seal.

FIG. 2 shows a cross-sectional profile of the mesa-shaped nub 11 of the present invention.

Figure 3:
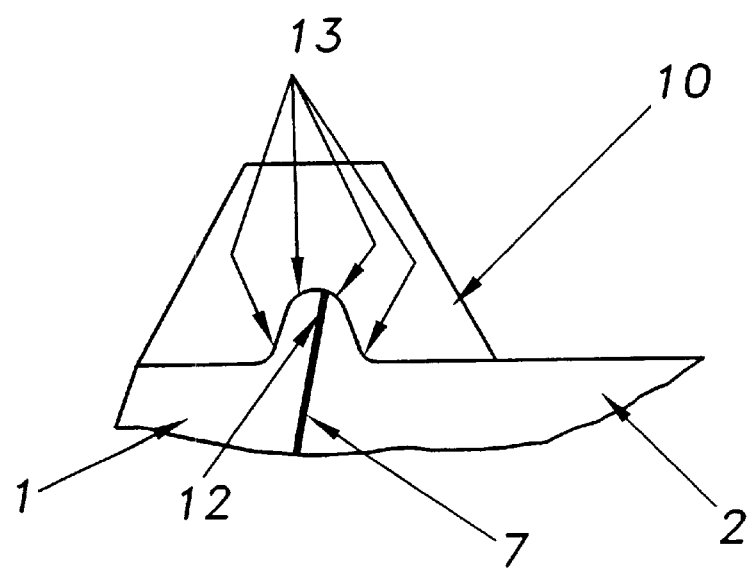
FIG. 3 is a cross-sectional view of a rounded nub interlocked with an edge seal.

The most preferred nub design is shown in FIG. 3. Nub 12 has rounded corners 13; this design tends to disperse mechanical stresses and make the nubs more durable.

Epoxy sealants, such as Araldite® 2012, are suitable materials for forming edge seal 10. Hardener/resin mixing and delivery of the epoxy to edge region 14 of device 8 can be accomplished by conventional means. For example, hardener and resin can be combined via a mixing apparatus and then applied or extruded onto edge region 14 of device 8. Preferably, the epoxy is applied over nub 11. If necessary, seal 10 is permitted to cure, resulting in an edge-sealed device.

As indicated earlier, the size of the nub is not believed to be critical. Key parameters include the size of the edge seal that the nub interlocks with and the thickness and type of substrates used.

EXAMPLE

The following example is presented for illustrative purposes only and is not intended to limit the invention in any way.

Example 1
Preparation of an Electrochromic Device Containing a Nubbed Edge Aligned with the Ion-Conducting Polymer Layer An electrochromic lens having a continuous circumferential edge nub aligned with its ion-conducting polymer layer was constructed by a cast-in-place technique as described below. The priming, cleaning, coating, bus bar, electrical connector, charging, ion-conducting polymer and laminating aspects of this example are not part of the instant invention.

Each of a matched pair of plastic substrates, polymerized from CR-39® monomer and primed with an organo silane hardcoat, was edged using a Santinelli model C 291 Aculens edger to form a half-nub on its edge adjacent to its mating surface. The half nub on each lens was about 0.25 mm in width by about 0.5 mm height. During the edging process, an edging wheel was used to shape each lens so as to form half of a rounded mesa along the circumferential edge of each part adjacent to its mating surface, similar to the shape shown in FIG. 3.

The edged lenses were cleaned and dried using an ultrasonic cleaning system. After these steps, a chrome-gold bus bar was applied to each of the half nubs via a vacuum deposition technique.

Thin films of $In_2O_3:SnO_2$ (ITO) were then deposited onto the mating surfaces of the nubbed plastic substrates using direct current (dc) magnetron sputtering so as to contact ITO with the bus bar. A thin metal strip was then affixed to each bus bar using a conductive epoxy. These strips served as electrical connectors.

Electrochromic layers were separately deposited onto the respective ITO coated plastic substrates. A tungsten oxide thin film was deposited on one substrate by direct current magnetron sputtering, and a nitrogen-containing iridium oxide thin film was deposited on the other substrate by direct current magnetron sputtering.

Following these depositions, the IrOxNy/ITO/primer/polymer substrate was electrochemically charged (reduced) in 0.1 normal aqueous hydrochloric acid. The $WO_3$/ITO/primer/polymer substrate was not electrochemically treated.

An ion-conducting polymer monomer solution comprising 2-acrylamido-2-methylpropanesulfonic acid (AMPSA) and N,N-dimethylacrylamide (DMA) in 1-methyl-2-pyrrolidinone (NMP) and water and containing an effective amount of a photoinitiator was prepared. This precursor was placed between the $WO_3$ and nitrogen-containing iridium oxide half cells and then exposed to suitable energy to cure the ion-conducting polymer, resulting in a laminated electrochromic device having a circumferential nub contiguous with the ICP layer.

We claim:

1. A laminated electrooptic device having a circumferential edge region comprising the outer surface of a layer prone to moisture gain or loss which is disposed between the outer surfaces of first and second substrates, wherein said circumferential edge region is characterized by a protrusion which comprises a portion of at least one of said substrates, and wherein said protrusion is contiguous with the outer surface of said layer prone to moisture gain or loss.

2. The device of claim 1, wherein said protrusion is mesa-shaped.

3. The device of claim 2, wherein said mesa-shaped protrusion has rounded corners.

4. The device of claim 1, wherein a bus bar is applied to said protrusion.

5. The device of claim 1, wherein said substrates are eyewear lenses.

6. The device of claim 1, wherein said layer prone to moisture gain or loss comprises an ion-conducting material.

7. The device of claim 1, wherein an edge seal is interlocked with said protrusion.

8. A laminated electrochromic device having a circumferential edge region comprising the outer surface of a first coated substrate, the outer surface of a second substrate, and the outer surface of an ion-conducting material layer disposed between the outer surfaces of said first and second substrates, wherein said circumferential edge region contains a nub which comprises a portion of at least one of said substrates and which is contiguous with a portion of the outer surface of said ion-conducting material layer.

9. The device of claim 8, wherein said nub comprises a portion of said first and second substrates.

10. The device of claim 8, wherein said nub is mesa-shaped.

11. The device of claim 10, wherein said mesa-shaped nub has rounded corners.

12. The device of claim 8, wherein a bus bar is applied to said nub.

13. The device of claim 8, wherein said substrates are eyewear lenses.

14. The device of claim 8, wherein said ion-conducting material layer comprises an ion-conducting polymer.

15. The device of claim 8, wherein an edge seal is interlocked with said nub.

16. A method for preparing a nubbed laminated electrooptic device comprising: 1) forming a nub comprising a portion of a first substrate on the outer edge of said first substrate adjacent to its mating surface; 2) optionally forming a nub comprising a portion of a second substrate on the outer edge of said second substrate adjacent to its mating surface; 3) disposing an electrooptic medium between the mating surfaces of said first and second substrates; and 4) laminating said first and second substrates by bonding their mating surfaces.

17. The method of claim 16, wherein said nub comprising a portion of said first substrate is continuous.

18. The method of claim 16, wherein said nub is mesa-shaped.

19. The method of claim 18, wherein said mesa-shaped nub has rounded corners.

20. The method of claim 16, wherein said electrooptic device is an electrochromic device.

21. The method of claim 20, wherein said first and second substrates are eyewear lenses.

22. The method of claim 21, wherein the lenses of said electrochromic device are bonded by an ion-conducting polymer prone to moisture ingress or egress.

23. The method of claim 22, wherein an edge seal is applied over said nub.

24. The method of claim 16, wherein an edge seal is applied over said nub.

25. The method of claim 17, wherein said electrooptic device is an electrochromic device.

26. The method of claim 21, wherein a nub is formed on the outer edge of each of said lenses.

27. The method of claim 25, wherein said electrochromic device is an electrochromic lens and wherein said first and second substrates are eyewear lenses.

28. The method of claim 27, wherein a nub is formed on the outer edge of each of said lenses.

29. The method of claim 28, wherein an edge seal is applied over said nub.

30. An electrooptic device comprising an electrooptic medium disposed between first and second substrates, said device having a circumferential edge region between first and second expanse regions, wherein the circumferential edge region of said device is characterized by a nub comprising a portion of at least one of said substrates, and wherein an edge seal is interlocked with said nub.

31. An electrochromic device having a circumferential edge region comprising the outer peripheral surface of a moisture-sensitive layer disposed between the outer peripheral surfaces of first and second substrates, wherein said circumferential edge region is characterized by a nub comprising a portion of at least one of said substrates which is interlocked with an edge seal.

* * * * *